(12) United States Patent
Zhou (10) Patent No.: US 10,664,189 B2
(45) Date of Patent: May 26, 2020

(54) PERFORMANCE IN SYNCHRONOUS DATA REPLICATION ENVIRONMENTS

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/113,092

(22) Filed: Aug. 27, 2018

(65) Prior Publication Data
US 2020/0065002 A1    Feb. 27, 2020

(51) Int. Cl.
*G06F 3/06*      (2006.01)
*G06F 12/0811*   (2016.01)
*G06F 12/0815*   (2016.01)

(52) U.S. Cl.
CPC ............ *G06F 3/065* (2013.01); *G06F 3/061* (2013.01); *G06F 3/067* (2013.01); *G06F 3/0653* (2013.01); *G06F 3/0656* (2013.01); *G06F 12/0811* (2013.01); *G06F 12/0815* (2013.01); *G06F 2212/1016* (2013.01); *G06F 2212/154* (2013.01); *G06F 2212/163* (2013.01)

(58) Field of Classification Search
CPC ............ G06F 11/2023; G06F 11/2025; G06F 11/203–2097; G06F 11/1008; G06F 11/076; G06F 11/1456; G06F 11/1469; G06F 11/1662; G06F 11/2094; G06F 3/067; G06F 3/061; G06F 3/065; G06F 3/0653
See application file for complete search history.

(56) References Cited

U.S. PATENT DOCUMENTS

| | | | | |
|---|---|---|---|---|
| 6,321,298 B1 * | 11/2001 | Hubis | ............... | G06F 11/2089 711/113 |
| 8,812,899 B1 * | 8/2014 | Fultz | ............... | G06F 12/0886 714/6.1 |
| 8,886,880 B2 | 11/2014 | Barrell et al. | | |
| 9,037,793 B1 * | 5/2015 | O'Brien, III | ......... | G06F 3/0689 711/114 |
| 9,323,671 B1 | 4/2016 | Harvey et al. | | |

(Continued)

OTHER PUBLICATIONS

IBM, "Integrated distance simulator for asynchronous remote copy (Global Mirror)", IP.com 2007 (Year: 2007).*

(Continued)

*Primary Examiner* — Khoa D Doan
(74) *Attorney, Agent, or Firm* — Nelson and Nelson; Daniel P. Nelson; Alexis V. Nelson (57) ABSTRACT

A method for improving I/O performance in synchronous data replication environments is disclosed. In one embodiment, such a method includes receiving write data into a primary write cache of a primary storage system. The method synchronously mirrors the write data from the primary write cache to a secondary write cache of a secondary storage system. The method is further configured to detect when the primary write cache is full. When the primary write cache is full, the method temporarily uses primary read cache of the primary storage system to store incoming write data. This incoming write data is mirrored from the primary read cache to the secondary write cache of the secondary storage system. A corresponding system and computer program product are also disclosed herein.

20 Claims, 8 Drawing Sheets

(56) References Cited

U.S. PATENT DOCUMENTS

| | | | |
|---|---|---|---|
| 9,348,752 B1* | 5/2016 | Parakh | G06F 11/1451 |
| 9,361,232 B2 | 6/2016 | Umamageswaran et al. | |
| 9,524,244 B2 | 12/2016 | Boden et al. | |
| 9,588,898 B1 | 3/2017 | Vinson et al. | |
| 9,626,294 B2 | 4/2017 | Bell, Jr. et al. | |
| 10,235,055 B1* | 3/2019 | Saad | G06F 3/067 |
| 2002/0124132 A1* | 9/2002 | Haines | G06F 3/0613 |
| | | | 711/112 |
| 2003/0023808 A1* | 1/2003 | Bakke | G06F 11/1666 |
| | | | 711/113 |
| 2003/0110350 A1* | 6/2003 | McGee | G06F 13/1642 |
| | | | 711/108 |
| 2003/0160893 A1* | 8/2003 | Greenfield | H04N 21/23406 |
| | | | 348/419.1 |
| 2003/0212869 A1* | 11/2003 | Burkey | G06F 11/1461 |
| | | | 711/162 |
| 2003/0212870 A1* | 11/2003 | Nowakowski | G06F 11/2082 |
| | | | 711/162 |
| 2004/0103247 A1* | 5/2004 | Bita | G06F 11/2071 |
| | | | 711/114 |
| 2004/0168052 A1* | 8/2004 | Clisham | H04W 12/001 |
| | | | 713/153 |
| 2004/0236983 A1* | 11/2004 | Burton | G06F 11/2058 |
| | | | 714/6.23 |
| 2004/0243743 A1* | 12/2004 | Smith | G06F 5/10 |
| | | | 710/52 |
| 2005/0055481 A1* | 3/2005 | Chou | G06F 13/387 |
| | | | 710/52 |
| 2005/0080991 A1* | 4/2005 | Keohane | G06F 11/2056 |
| | | | 711/114 |
| 2005/0114741 A1* | 5/2005 | Chen | G06F 11/0727 |
| | | | 714/6.23 |
| 2005/0198411 A1* | 9/2005 | Bakke | G06F 12/0804 |
| | | | 710/22 |
| 2005/0210317 A1* | 9/2005 | Thorpe | G06F 3/0613 |
| | | | 714/6.32 |
| 2005/0216660 A1* | 9/2005 | Kobayashi | G06F 11/1666 |
| | | | 711/113 |
| 2005/0278494 A1* | 12/2005 | Hillier, III | G06F 11/1666 |
| | | | 711/162 |
| 2006/0106982 A1* | 5/2006 | Ashmore | G06F 11/2089 |
| | | | 711/114 |
| 2006/0174067 A1* | 8/2006 | Soules | G06F 12/0804 |
| | | | 711/135 |
| 2006/0253731 A1* | 11/2006 | Petruzzo | G06F 11/1456 |
| | | | 714/6.2 |
| 2007/0226401 A1* | 9/2007 | Huang | G06F 11/1068 |
| | | | 711/103 |
| 2009/0150627 A1* | 6/2009 | Benhase | G06F 11/2082 |
| | | | 711/162 |
| 2009/0182960 A1* | 7/2009 | Crockett | G06F 11/2074 |
| | | | 711/162 |
| 2009/0249116 A1* | 10/2009 | Bartfai | G06F 11/2066 |
| | | | 714/6.12 |
| 2009/0265507 A1* | 10/2009 | Jibbe | G06F 12/0866 |
| | | | 711/103 |
| 2010/0049920 A1 | 2/2010 | Lafrese et al. | |
| 2010/0199042 A1* | 8/2010 | Bates | H04L 9/0891 |
| | | | 711/114 |
| 2011/0047440 A1* | 2/2011 | Blackmon | G06F 11/1008 |
| | | | 714/764 |
| 2011/0087837 A1* | 4/2011 | Blinick | G06F 11/1076 |
| | | | 711/114 |
| 2011/0191535 A1* | 8/2011 | Yuasa | G06F 12/08 |
| | | | 711/113 |
| 2011/0296100 A1* | 12/2011 | Plank | G06F 11/1662 |
| | | | 711/113 |
| 2014/0006730 A1* | 1/2014 | Zain | G06F 13/16 |
| | | | 711/155 |
| 2014/0201442 A1 | 7/2014 | Rajasekaran et al. | |
| 2014/0281123 A1* | 9/2014 | Weber | G06F 12/0246 |
| | | | 711/103 |
| 2014/0317335 A1* | 10/2014 | Fukutomi | G06F 3/0685 |
| | | | 711/103 |
| 2014/0351626 A1* | 11/2014 | Best | G06F 11/16 |
| | | | 714/6.3 |
| 2015/0052385 A1* | 2/2015 | Galbraith | G06F 12/0888 |
| | | | 714/6.3 |
| 2015/0095696 A1* | 4/2015 | Hess | G06F 11/108 |
| | | | 714/6.24 |
| 2015/0278000 A1* | 10/2015 | Nakashima | G06F 12/0893 |
| | | | 714/6.24 |
| 2015/0331696 A1* | 11/2015 | Maruyama | G06F 9/4416 |
| | | | 711/113 |
| 2016/0170685 A1* | 6/2016 | Chakkravarthy | G06F 3/061 |
| | | | 711/114 |
| 2017/0075811 A1* | 3/2017 | Hsu | G06F 3/064 |
| 2017/0111468 A1* | 4/2017 | Ash | H04L 67/2852 |
| 2018/0081591 A1* | 3/2018 | Maheshwari | G06F 3/061 |
| 2018/0189178 A1* | 7/2018 | Kaminski | G06F 12/0851 |
| 2018/0260331 A1* | 9/2018 | Kotte | G06F 12/0868 |
| 2019/0179761 A1* | 6/2019 | Gupta | G06F 12/0806 |

OTHER PUBLICATIONS

Wu, et al., "CWC: Compressed Write Cache for Improving Storage System Performance," Frontier of Computer Science and Technology, 2009. FCST '09. Fourth International Conference on, Dec. 2009. (Abstract Only).

* cited by examiner

PERFORMANCE IN SYNCHRONOUS DATA REPLICATION ENVIRONMENTS

BACKGROUND

Field of the Invention

This invention relates to systems and methods for improving performance in synchronous data replication environments.

Background of the Invention

In synchronous data replication environments such as Peer-to-Peer-Remote-Copy ("PPRC") environments, data is synchronously mirrored from a primary storage system to a secondary storage system to maintain two consistent copies of the data. The primary and secondary storage systems may be located at different sites, perhaps hundreds or even thousands of miles away from one another. In the event the primary storage system fails, I/O may be redirected to the secondary storage system, thereby enabling continuous operations. When the primary storage system is repaired, I/O may be redirected back to the former primary storage system. The process of redirecting I/O from the primary storage system to the secondary storage system when a failure or other event occurs may be referred to as a swap or HyperSwap.

In synchronous data replication environments such as those discussed above, write cache my be utilized in both the primary storage system and secondary storage system. This write cache is typically implemented in very high speed memory, such as non-volatile random-access memory (NVRAM). This high speed memory may be battery-backed to ensure that data in the write cache is preserved in the event of an outage at the primary storage system.

When data is written to the primary storage system, the data may be saved in its write cache and then mirrored to the write cache on the secondary storage system. The data may be destaged from the write cache to back-end storage drives (e.g., hard disk drives, solid state drives, etc.) as time and resources allow in accordance in accordance with a cache destage algorithm. Destaging data to the storage drives is typically much, much slower than writing data to the write cache.

In certain cases, such as when write workloads spike on the primary storage system, storage space in the write cache of the primary storage system may be fully consumed. This may cause a significant spike in I/O response times, since data may need to be synchronously destaged from the write cache to back-end storage drives (a much slower process) in order to clear space in the write cache.

In view of the foregoing, what are needed are systems and methods to avoid performance impacts caused by a full write cache on the primary storage system.

SUMMARY

The invention has been developed in response to the present state of the art and, in particular, in response to the problems and needs in the art that have not yet been fully solved by currently available systems and methods. Accordingly, the invention has been developed to improve I/O performance in synchronous data replication environments. The features and advantages of the invention will become more fully apparent from the following description and appended claims, or may be learned by practice of the invention as set forth hereinafter.

Consistent with the foregoing, a method for improving I/O performance in synchronous data replication environments is disclosed. In one embodiment, such a method includes receiving write data into a primary write cache of a primary storage system. The method synchronously mirrors the write data from the primary write cache to a secondary write cache of a secondary storage system. The method is further configured to detect when the primary write cache is full. When the primary write cache is full, the method temporarily uses primary read cache of the primary storage system to store incoming write data. This incoming write data is mirrored from the primary read cache to the secondary write cache of the secondary storage system.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
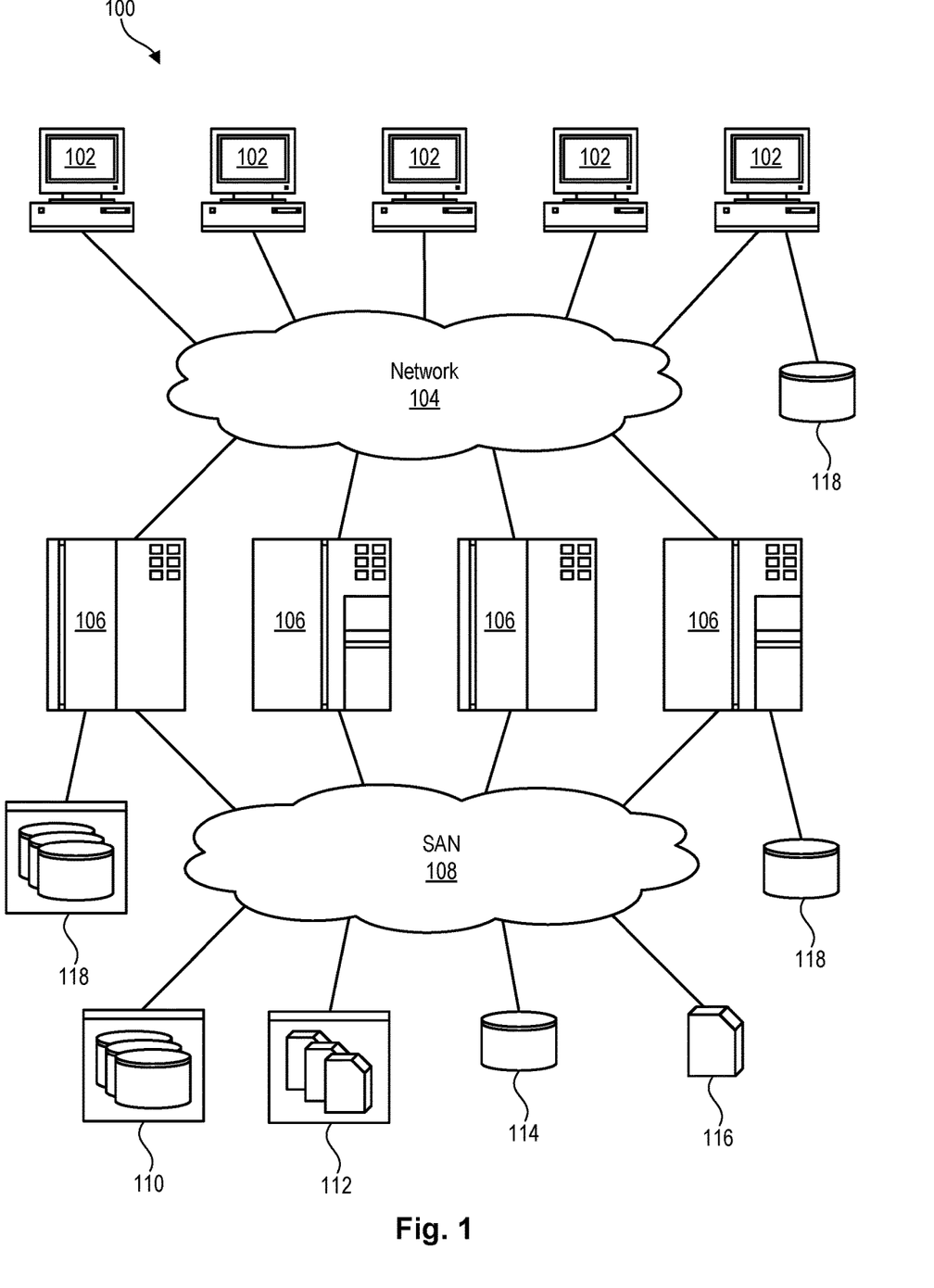
FIG. 1 is a high-level block diagram showing one example of network environment in which systems and methods in accordance with the invention may be implemented.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 118 (e.g., arrays of hard-disk drives, solid-state drives, tape drives, etc.). These computers 102, 106 and direct-attached storage systems 118 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, virtual tape systems, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
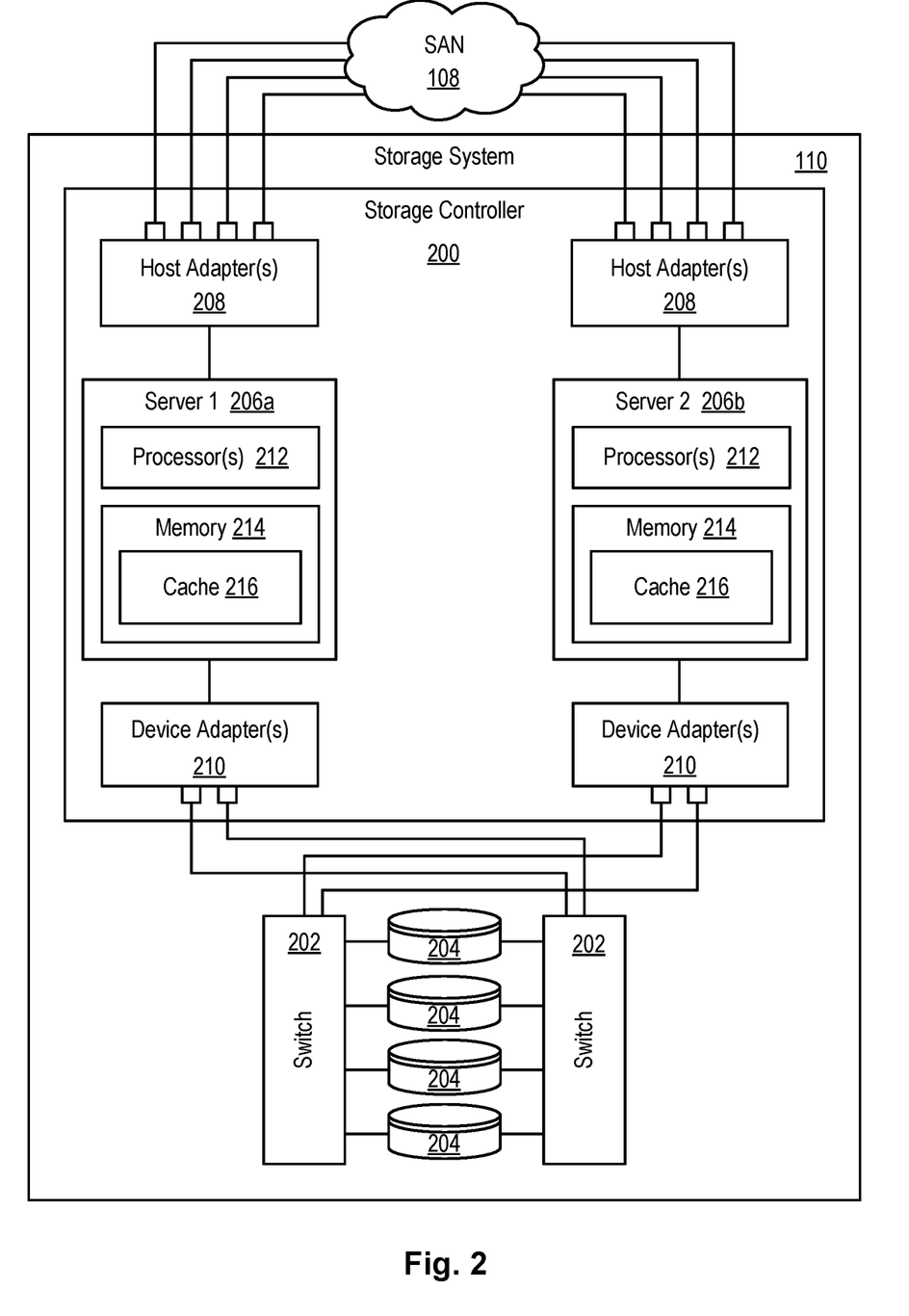
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the storage system 110. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). In certain embodiments, some percentage of the memory 214 may be used as system cache 216. The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
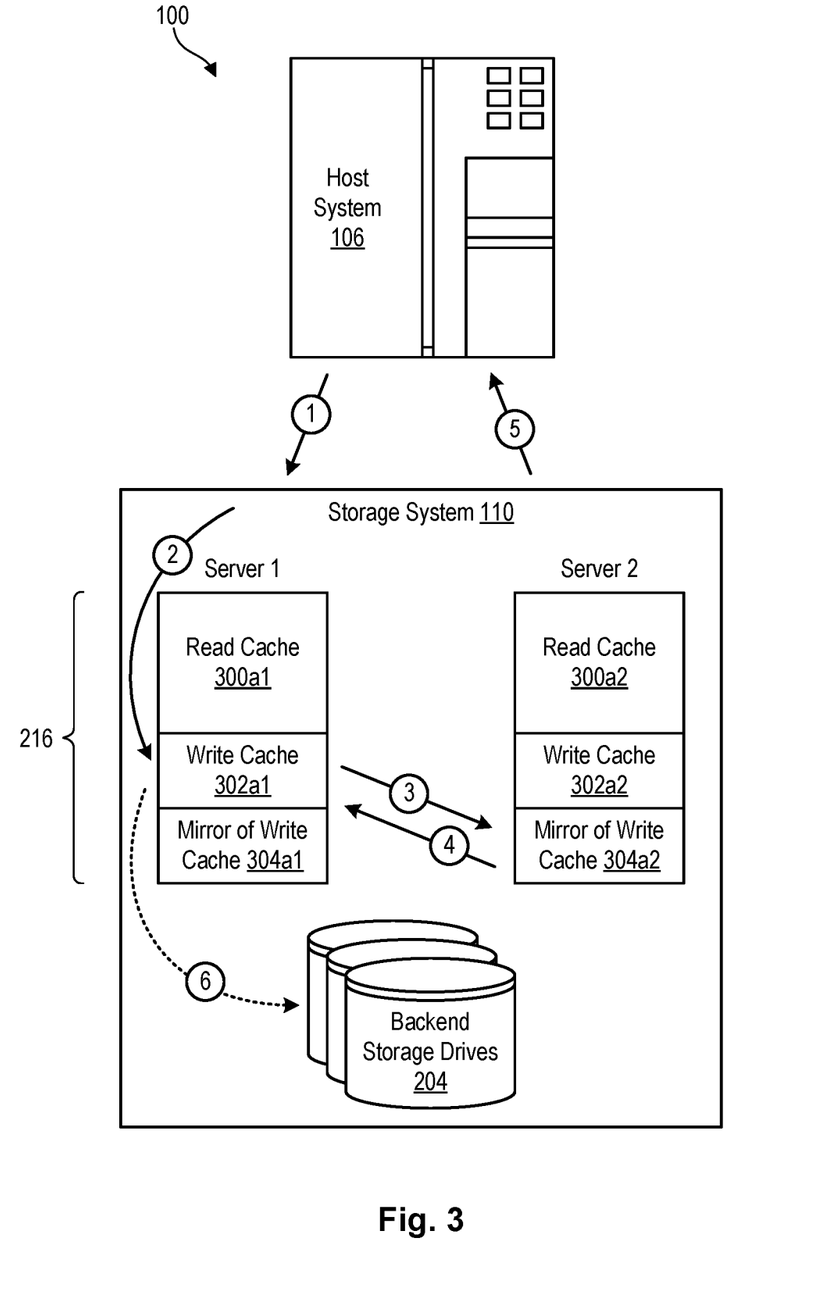
FIG. 3 is a high-level block diagram showing an exemplary sequence of events that may occur when writing to a storage system such as that illustrated in FIG. 2.

Referring to FIG. 3, while continuing to refer generally to FIG. 2, the system cache 216 of each server 206 may, in certain embodiments, include read cache 300, write cache 302, and an area 304 to store a mirror copy of writes in the write cache 302 of the opposite server 206. Whenever a host 106 performs a read operation, the server 206 that performs the read may fetch data from the backend storages drives 204 and save it in its read cache 300 in the event it is required again. If the data is requested again by a host 106, the server 206 may fetch the data from the read cache 300 instead of fetching it from the backend storage drives 204, saving both time and resources. Similarly, when a host 106 performs a write operation, the server 106 that receives the write request may store the write data in its write cache 302, and destage the write data to the backend storage drives 204 at a later time. When write data is stored in the write cache 302, the write data may also be stored in the area 304 (also called "non-volatile storage" (NVS) 304 in implementations of the IBM DS8000™) of the opposite server 206 to provide redundancy and ensure that the write data may be recovered by the opposite server 206 in the event the first server 206 fails. In general, the read cache 300 and write cache 302 may accelerate reads and writes and enhance I/O performance.

FIG. 3 shows an exemplary sequence of events that may occur when writing data to a storage system 110 such as that illustrated in FIG. 2. These events are numbered one through six in the order that they may occur within the storage system 110, although the order may vary in different embodiments. Similarly, the events are not intended to provide an exclusive list of all events that may occur within the storage system 110. Other events may or may not occur and some events may be omitted for the purposes of simplicity.

These events may include: (1) transmitting a write request from the host system 106 to the storage system 110; (2) assuming the write request is processed by the first server, saving, by the first server, write data associated with the write request in write cache 302a1 of the first server; (3) saving a copy of the write data in the area 304a2 of the second server, (4) returning an acknowledgement from the second server to the first server that the write data was successfully stored in the area 304a2; (5) returning an acknowledgement from the storage system 110 to the host system 106 that the write request completed successfully; and (6) at some later time, destaging the write data from the write cache 302a1 to backend storage drives 204 of the storage system 110 in accordance with a cache destage algorithm.

Figure 4:
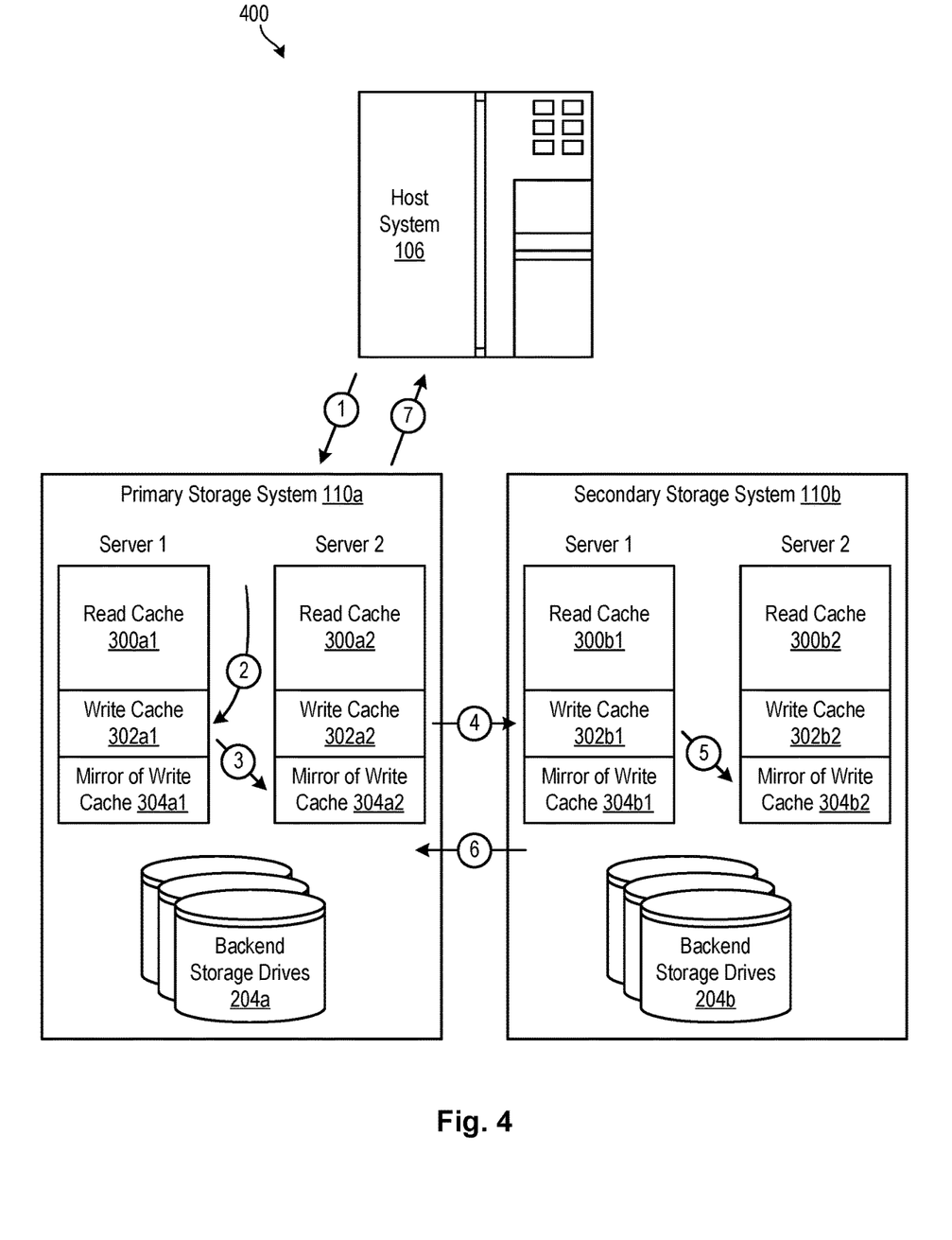
FIG. 4 is a high-level block diagram showing an exemplary sequence of events that may occur when writing to a synchronous data replication system when storage space is available in the write cache of the primary storage system.

Referring to FIG. 4, in certain embodiments, multiple storage systems 110 may be configured in a synchronous data replication system 400, such as a Peer-to-Peer-Remote-Copy (PPRC) system 400. The synchronous data replication system 400 is presented to show an example of an architecture in which embodiments of the invention may operate, and is not intended to be limiting. In general, the synchronous data replication system 400 establishes a mirroring relationship between one or more primary volumes (implemented on backend storage drives 204a) and one or more secondary volumes (implemented on backend storage drives 204b). Once this relationship is established, a consistent copy of data is maintained on the volumes. The primary and secondary volumes may be located on the same storage system 110, although the volumes are typically located on separate storage systems 110a, 110b located some distance (e.g., several miles to thousands of miles) from one another. Channel extension equipment may be located between the storage systems 110a, 110b as needed, to extend the distance over which the storage systems 110a, 110b may communicate.

FIG. 4 shows an exemplary sequence of events that may occur when writing data to the synchronous data replication system 400. This sequence of events assumes that storage space is available in the write cache 302 of each of the primary storage system 110a and secondary storage system 110b. These events are numbered one through seven in the order that they may occur within the synchronous data replication system 400. These events may include: (1) transmitting a write request from the host system 106 to the primary storage system 110a; (2) assuming the write request is processed by the first server in the primary storage system 110a, writing, by the first server, data associated with the write request to the write cache 302a1 of the first server; (3) saving a copy of the write data in the area 304a2 of the second server; (4) mirroring a copy of the write data to the secondary storage system 110b and writing this copy to the write cache 302b1 of the first server; (5) saving a copy of the write data in the area 304b2 of the second server; (6) returning an acknowledgement from the secondary storage system 110b to the primary storage system 110a indicating that the write request completed successfully on the secondary storage system 110b; and (7) returning an acknowledgement from the primary storage system 110a to the host system 106 indicating that the write request completed successfully on the primary storage system 110a. At some later time, the write data may be destaged from the write cache 302a1 to the backend storage drives 204a, and from the write cache 302b1 to the backend storage drives 204b.

In the event the primary storage system 110a fails, I/O may be redirected to the secondary storage system 110b to enable continuous operations. This process may be referred to as a swap or HyperSwap. Since the secondary storage system 110b contains a consistent copy of the data on the primary storage system 110a, the redirected I/O (e.g., reads and writes) may be performed on the copy of the data on the secondary storage system 110b. When the primary storage system 110a is repaired or resumes operation, data written while the primary storage system 110a was down may be restored to the primary storage system 110a. I/O may then be re-directed to the primary storage system 110a and mirrored to the secondary storage system 110b.

Figure 5:
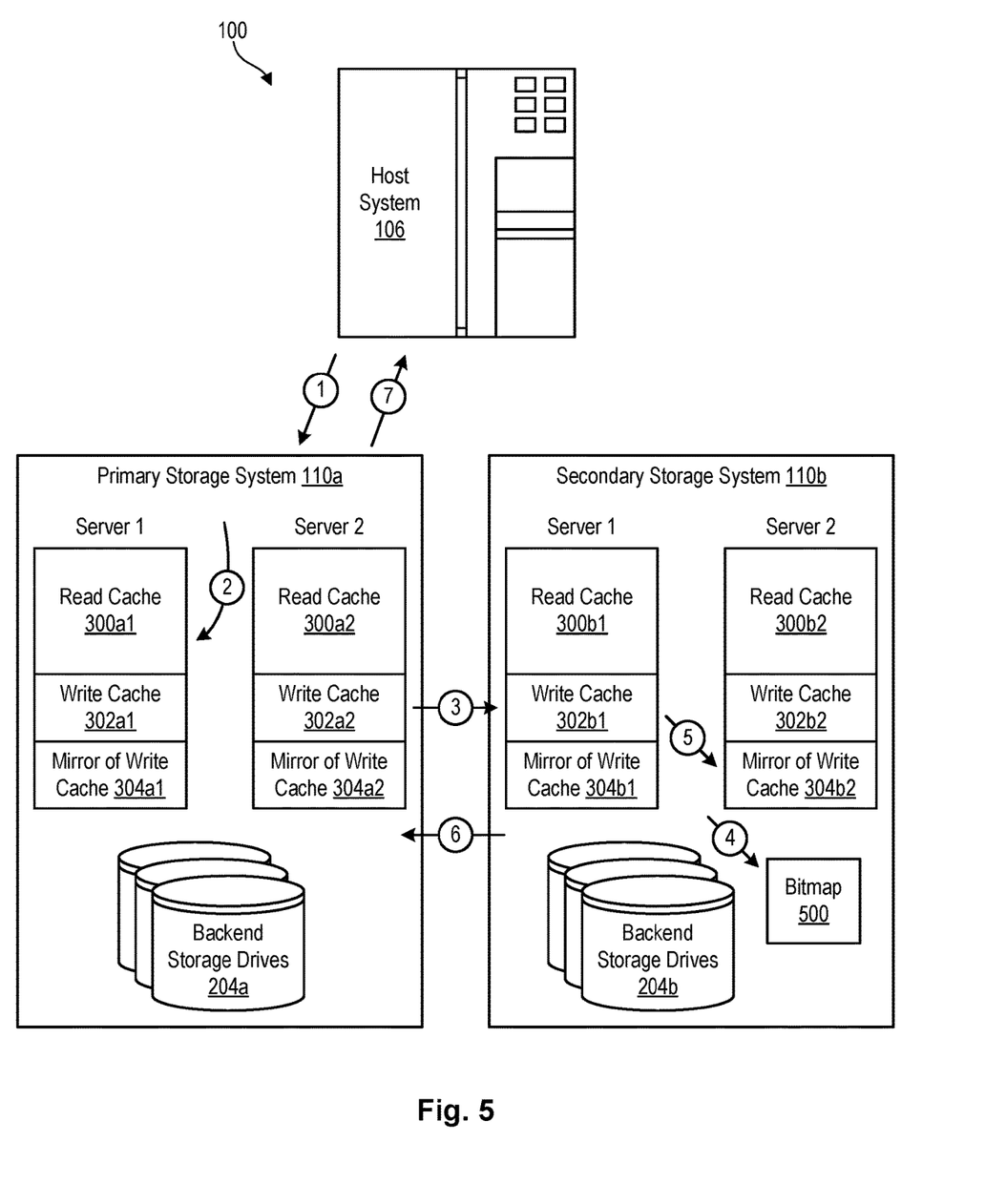
FIG. 5 is a high-level block diagram showing an exemplary sequence of events that may occur when writing to a synchronous data replication system when the write cache of the primary storage system is full.

Referring to FIG. 5, as previously mentioned, in certain cases, such as when write workloads spike on the primary storage system 110a, storage space in the write cache 302a1 of the primary storage system 110a may be fully consumed. This may cause a significant spike in I/O response times, since data may need to be synchronously destaged from the write cache 302a1 to the backend storage drives 204a in order to clear space in the write cache 302a1. As previously mentioned, destaging data to the backend storage drives 204a is typically much, much slower than writing data to the write cache 302a1.

Nevertheless, when the write cache 302a1 on the primary storage system 110a is full, the corresponding write cache 302b1 on the secondary storage system 110b may still have available storage space, despite the fact that the write cache 302b1 receives most or all of the same write data as the write cache 302a1 of the primary storage system 110a. This may occur because the secondary storage system 110b does not handle read requests and other tasks that the primary storage system 110a handles and thus has more resources to dedicate to tasks such as destaging writes from the write cache 302b1. Thus, even when the write cache 302a1 of the primary storage system 110a is full, the write cache 302b1 of the secondary storage system 110b may still have space available.

In order to avoid negative performance impacts associated with a full write cache 302a1 on the primary storage system 110a, systems and methods in accordance with the invention may, when the write cache 302a1 is full, temporarily use the read cache 300a1 of the primary storage system 110a to store incoming write data. This write data may be mirrored to the write cache 302b1 in the secondary storage system 110b, thereby providing redundancy for the write data. Thus, if an outage or failure were to occur at the primary storage system 110a (thereby causing loss of all data in the read cache 300a1 since the read cache 300 is typically not battery-backed or duplicated to the opposite server 206), the write data may still be recoverable from the secondary storage system 110b.

FIG. 5 shows an exemplary sequence of events that may occur when writing data to the synchronous data replication system 400 using systems and methods in accordance with the invention. This sequence assumes that no additional storage space is available in the write cache 302a1 of the primary storage system 110a. These events are numbered one through seven in the order that they may occur within the synchronous data replication system 400. These events may include: (1) transmitting a write request from the host system 106 to the primary storage system 110a; (2) assuming the write request is processed by the first server in the primary storage system 110a and the write cache 302a1 of the first server is full, writing, by the first server, data associated with the write request to the read cache 300a1 and marking the write data as "write data in read cache"; (3) mirroring a copy of the write data to the secondary storage system 110b and writing this copy to the write cache 302b1 of the first server of the secondary storage system 110b; (4) because the data is marked "write data in read cache," recording, in a bitmap 500 or other data structure 500, that the write data is stored in read cache 300 of the primary storage system 110a; (5) saving a copy of the write data in the area 304b2 of the second server of the secondary storage system 110b; (6) returning an acknowledgement from the secondary storage system 110b to the primary storage system 110a indicating that the write request completed successfully on the secondary storage system 110b; and (7) returning an acknowledgement from the primary storage system 110a to the host system 106 indicating that the write request completed successfully on the primary storage system 110a. At some later time, the write data may be destaged from the write cache 302b1 to the backend storage drives 204b.

In the event a failure or outage occurs on the primary storage system 110a, the write data that is stored in the read cache 300a1 of the primary storage system 110a may be lost. However, this write data may reside on the secondary storage system 110b. When the primary storage system 110a is fixed and resumes operation, the bitmap 500 at the secondary storage system 110b may be checked to determine which write data, which was stored in the read cache 300a1 of the primary storage system 110a, was persisted on the secondary storage system 110b. This write data may then be copied from the secondary storage system 110b to the primary storage system 110a to restore all write data that was stored in the read cache 300a1 at the time the primary storage system 110a failed. This will prevent loss of this write data.

Figure 6A:
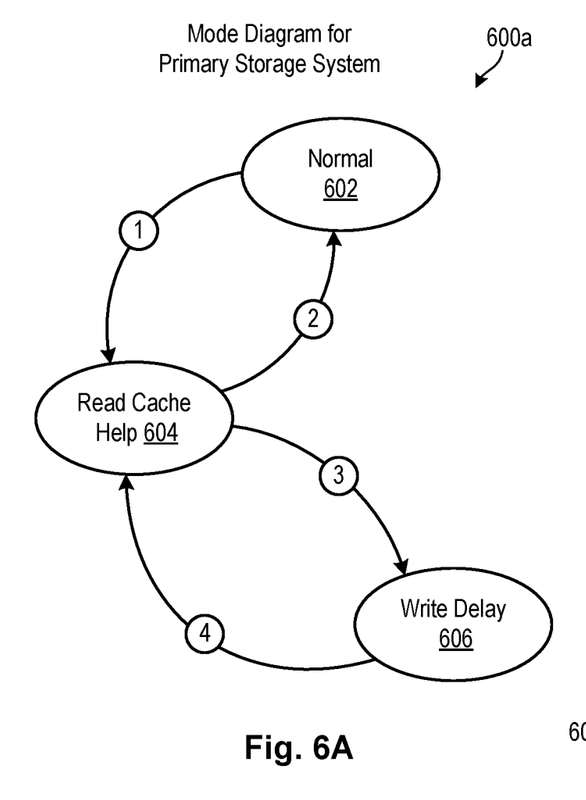
FIG. 6A is an exemplary state diagram showing different operating modes for the primary storage system.
Figure 6B:
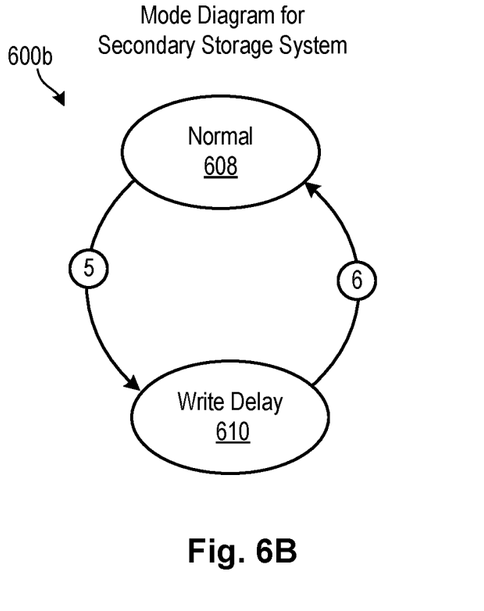
FIG. 6B is an exemplary state diagram showing different operating modes for the secondary storage system.

Referring to FIGS. 6A and 6B, operation of the primary storage system 110a and secondary storage system 110b may be understood using various state diagrams 600a and 600b. FIG. 6A is an exemplary state diagram for the primary storage system 110a. FIG. 6B is an exemplary state diagram for the secondary storage system 110b.

As shown in FIG. 6A, the primary storage system 110a may operate in one of three different modes, namely: a normal mode 602 where space is available in the write cache 302a1 of the primary storage system 110a and the primary storage system 110a saves write data in the write cache 302a1; a "read cache help" mode 604 where no space is available in the write cache 302a1 of the primary storage system 110a and the primary storage system 110a saves write data in the read cache 300a1; and a "write delay" mode 606 where there is no space available in the write cache 302a1 of the primary storage system 110a or write cache 302b1 of the secondary storage system 110b and writes received by the primary storage system 110a require synchronous destages from the write cache 302a1 to the backend storage drives 204a.

The secondary storage system 110b, by contrast, may operate in one of two different modes, namely: a normal mode 608 where space is available in the write cache 302b1 of the secondary storage system 110b; and a "write delay" mode 610 where there is no space available in the write cache 302b1 of the secondary storage system 110b and all writes received by the secondary storage system 110b require synchronous destages from the write cache 302b1 to the backend storage drives 204b.

The following transition events may cause the primary storage system 110a and secondary storage system 110b to transition between modes. These transition events are marked as one through six in FIGS. 6A and 6B. These transition events include: (1) the write cache 302a1 on the primary storage system 110a becomes full; (2) the write cache 302a1 on the primary storage system 110a has available free space; (3) the secondary storage system 110b enters into the "write delay" mode 610; (4) the secondary storage system 110b returns to the normal mode 608; (5) the write cache 302b1 of the secondary storage system 110b becomes full; and (6) the write cache 302b1 of the secondary storage system 110b has available free space.

Figure 7:
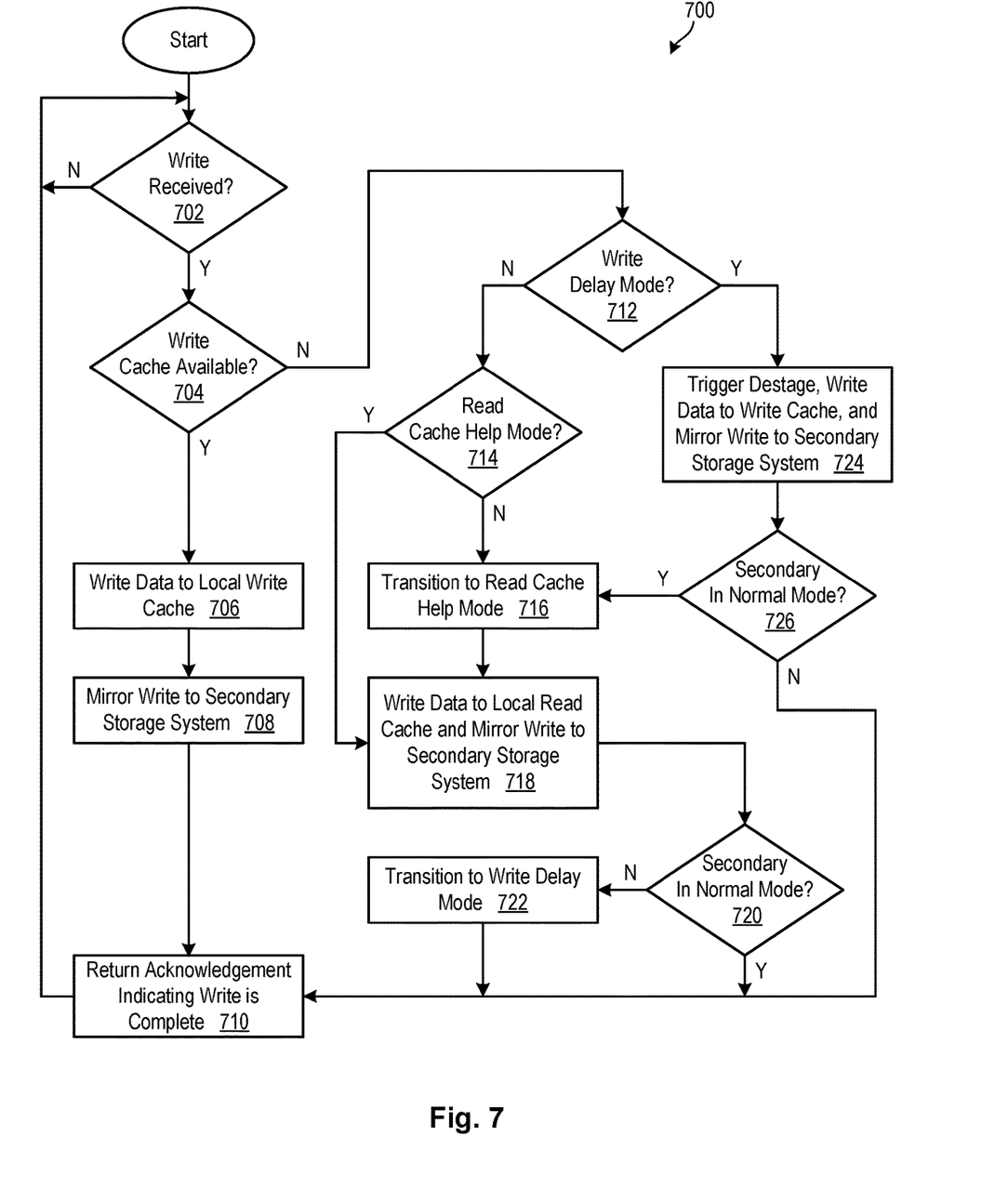
FIG. 7 is a process flow diagram showing one embodiment of a method for processing a write request on the primary storage system.

Referring to FIG. 7, one embodiment of a method 700 for processing a write request on the primary storage system 110a is disclosed. As shown in FIG. 7, when a write request is received at step 702, the method 700 determines 704 whether the write cache 302a1 on the primary storage system 110a has available free space. If so, the method 700 writes 706 data associated with the write request to the write cache 302a1 of the primary storage system 110a and mirrors 708 this write data to the secondary storage system 110b. Assuming that this write completes successfully on the secondary storage system 110b, the method 700 returns 710, to a host system 106, an acknowledgement indicating that the write request completed successfully.

If, at step 704, no space is available in the write cache 302a1 of the primary storage system 110a, the method 700 determines 712 whether the primary storage system 110a is in "write delay" mode. If so, the method 700 triggers 724 a destage from the write cache 302a1, writes 724 data associated with the write request to the write cache 302a1, and mirrors 724 the write data to the secondary storage system 110b. The method 700 then determines 712 whether the secondary storage system 110b is in normal mode. If the secondary storage system 110b is in normal mode, the method 700 transitions 716 the primary storage system 110a to "read cache help" mode. If the secondary storage system 110b is not in normal mode (meaning that it is in "write delay" mode), the method 700 returns 710 an acknowledgement to the host system 106 indicating that the write is complete.

If, at step 712, the primary storage system 110a is not in "write delay" mode, the method 700 determines 714 whether the primary storage system 110a is in "read cache help" mode. If not, the method 700 transitions 716 the primary storage system 110a into "read cache help" mode and writes 718 the data associated with the write request to the local read cache 300a1 and mirrors 718 this write data to the secondary storage system 110b. If, at step 714, the primary storage system 110a is already in "read cache help" mode, the method 700 writes 718 the data associated with the write request to the local read cache 300a1 and mirrors 718 this write data to the secondary storage system 110b. The method 700 then determines 720 whether the secondary storage system 110b is in normal mode. If not (i.e., the secondary storage system 110b is in "write delay" mode), the method 700 transitions 722 the primary storage system 110a into "write delay" mode and the method 700 returns 710 an acknowledgement to the host system 106 indicating that the write is complete.

Figure 8:
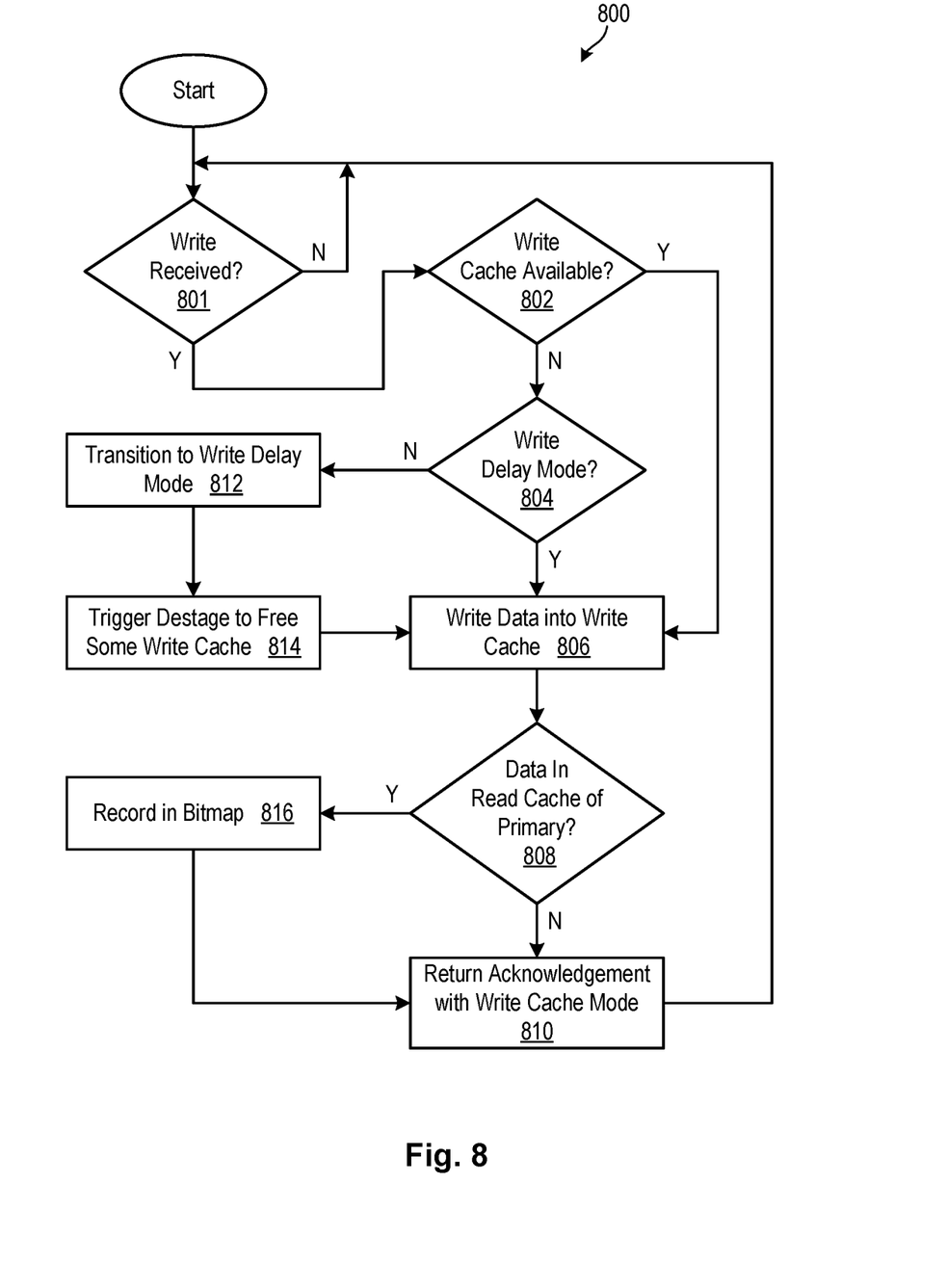
FIG. 8 is a process flow diagram showing one embodiment of a method for processing a write request on the secondary storage system.

Referring to FIG. 8, one embodiment of a method 800 for processing a write request on the secondary storage system 110b is disclosed. As shown, when the secondary storage system 110b receives a write request from the primary storage system 110a at step 801, the method 800 determines 802 whether storage space is available in the write cache 302b1 of the secondary storage system 110b. If so, the method 800 writes 806 data associated with the write request to the write cache 302b1. The method 800 then determines 808 whether the data that was written to the write cache 302b1 is in the read cache 300a1 of the primary storage system 110a (e.g., whether the write data is marked as "write data in read cache"). If so, the method 800 records 816 this information in the bitmap 500 and the method 800 returns 810, to the primary storage system 110a, an acknowledgement indicating that the write request completed successfully on the secondary storage system 110b.

If, at step 802, no space is available in the write cache 302b1 of the secondary storage system 110b, the method 800 determines 804 whether the secondary storage system 110b is in "write delay" mode. If not, the method 800 transitions 812 the secondary storage system 110b to "write delay" mode and triggers 814 a destage from the write cache 302b1 to free up space in the write cache 302b1. The method 800 then writes 806 the data associated with the write request to the write cache 302b1. The method 800 then determines 808 whether the data that was written to the write cache 302b1 is in the read cache 300a1 of the primary storage system 110a. If so, the method 800 records 816 this information in the bitmap 500 and returns 810, to the primary storage system 110a, an acknowledgement indicating that the write request completed successfully on the secondary storage system 110b.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving performance in synchronous data replication environments, the method comprising:
   receiving write data into a primary write cache of a primary storage system;
   synchronously mirroring the write data from the primary write cache to a secondary write cache of a secondary storage system;
   detecting when the primary write cache is full;
   when the primary write cache is full, temporarily using primary read cache of the primary storage system to store incoming write data; and
   recording, in a data structure maintained on the secondary storage system, that the incoming write data is stored in the primary read cache.

2. The method of claim 1, further comprising mirroring the incoming write data from the primary read cache to the secondary write cache.

3. The method of claim 2, wherein mirroring the incoming write data comprises marking the incoming write data to indicate that it the incoming write data is stored in the primary read cache.

4. The method of claim 1, wherein the data structure is a bitmap.

5. The method of claim 1, wherein the primary write cache is implemented using battery-hacked volatile memory.

6. The method of claim 1, wherein the primary read cache is implemented using non-battery-backed volatile memory.

7. The method of claim 1, wherein receiving the write data into the primary write cache further comprises duplicating the write data across servers of the primary storage system.

8. A computer program product for improving performance in synchronous data replication environments, the computer program product comprising a non-transitory computer-readable storage medium having computer-usable program code embodied therein, the computer-usable program code configured to perform the following when executed by at least one processor:
   receive write data into a primary write cache of a primary storage system;
   synchronously mirror the write data from the primary write cache to a secondary write cache of a secondary storage system;
   detect when the primary write cache is full;
   when the primary write cache is full, temporarily use primary read cache of the primary storage system to store incoming write data; and
   record, in a data structure maintained on the secondary storage system, that the incoming write data is stored in the primary read cache.

9. The computer program product of claim 8, wherein the computer-usable program code is further configured to mirror the incoming write data from the primary read cache to the secondary write cache.

10. The computer program product of claim 9, wherein mirroring the incoming write data comprises marking the incoming write data to indicate that the incoming write data is stored in the primary read cache.

11. The computer program product of claim 8, wherein the data structure is a bitmap.

12. The computer program product of claim 8, wherein the primary write cache is implemented using battery-backed volatile memory.

13. The computer program product of claim 8, wherein the primary read cache is implemented using non-battery-backed volatile memory.

14. The computer program product of claim 8, wherein receiving the write data into the primary write cache further comprises duplicating the write data across servers of the primary storage system.

15. A system for improving performance in synchronous data replication environments, the system comprising:
   at least one processor;
   at least one memory device operably coupled to the at least one processor and storing instructions for execution on the at least one processor, the instructions causing the at least one processor to:
   receive write data into a primary write cache of a primary storage system;
   synchronously mirror the write data from the primary write cache to a secondary write cache of a secondary storage system;
   detect when the primary write cache is full;
   when the primary write cache is full, temporarily use primary read cache of the primary storage system to store incoming write data; and
   record, in a data structure maintained on the secondary storage system, that the incoming write data is stored in the primary read cache.

16. The system of claim 15, wherein the instructions further cause the at least one processor to mirror the incoming write data from the primary read cache to the secondary write cache.

17. The system of claim 16, wherein mark mirroring the incoming write data comprises marking the incoming write data to indicate that the incoming write data is stored in the primary read cache.

18. The system of claim 15, wherein the data structure is a bitmap.

19. The system of claim 15, wherein the primary write cache is implemented using battery-backed volatile memory and the primary read cache is implemented using non-battery-backed volatile memory.

20. The system of claim 15, wherein receiving the write data into the primary write cache further comprises duplicating the write data across servers of the primary storage system.

* * * * *